US012234746B2

(12) United States Patent
Collado
(10) Patent No.: US 12,234,746 B2
(45) Date of Patent: Feb. 25, 2025

(54) HUB-MOUNTED ELECTRIC BLADE PITCH CONTROL

(71) Applicant: Textron eAviation Inc., Providence, RI (US)

(72) Inventor: Paul C. Collado, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 0 days.

(21) Appl. No.: 18/600,954

(22) Filed: Mar. 11, 2024

(65) Prior Publication Data

US 2024/0309768 A1 Sep. 19, 2024

Related U.S. Application Data

(60) Provisional application No. 63/490,515, filed on Mar. 15, 2023.

(51) Int. Cl.
*F01D 7/00* (2006.01)

(52) U.S. Cl.
CPC ...... *F01D 7/00* (2013.01); *F05D 2260/40311* (2013.01); *F05D 2260/70* (2013.01)

(58) Field of Classification Search
CPC .................................. F01D 7/00; B64C 11/30
See application file for complete search history.

(56) References Cited

U.S. PATENT DOCUMENTS

| | | | |
|---|---|---|---|
| 3,487,880 A | 1/1970 | Alfred et al. | |
| 3,917,195 A | 11/1975 | Oguri | |
| 4,523,891 A | 6/1985 | Schwartz et al. | |
| 5,199,850 A | 4/1993 | Carvalho et al. | |
| 8,167,553 B2 | 5/2012 | Perkinson et al. | |
| 8,753,085 B2 | 6/2014 | Lovgren et al. | |
| 9,322,284 B2 | 4/2016 | Liu et al. | |
| 9,677,408 B2 | 6/2017 | Tajan et al. | |
| 10,766,604 B2 | 9/2020 | Wergifosse | |
| 11,479,339 B2 | 10/2022 | Danielson | |
| 11,807,354 B2 | 11/2023 | Zamponi | |
| 2013/0216380 A1 | 8/2013 | Liu et al. | |
| 2017/0247107 A1 | 8/2017 | Hauer et al. | |
| 2019/0118936 A1* | 4/2019 | De Wergifosse | F01D 7/00 |
| 2020/0331585 A1 | 10/2020 | Sartorius | |
| 2021/0139157 A1 | 5/2021 | Thompson et al. | |

(Continued)

FOREIGN PATENT DOCUMENTS

EP 3501980 A1 6/2019

OTHER PUBLICATIONS

Extended European Search Report issued May 23, 2023 by the European Patent Office in corresponding European App. No. 22216155.6.

*Primary Examiner* — Brian O Peters
(74) *Attorney, Agent, or Firm* — Avek IP, LLC

(57) ABSTRACT

An electromechanical blade pitch control system includes a propeller hub, a blade having an adjustable pitch angle, and a blade bearing hub operably coupled to the blade. The system includes a linear actuator operably coupled to the blade bearing hub and a rotary actuator operably coupled to the linear actuator via a planetary gear system. The system is configured such that the blade bearing hub, linear actuator, and rotary actuator are housed within the propeller hub, and further configured such that actuation of the linear actuator results in a change in a pitch angle of the blade.

11 Claims, 5 Drawing Sheets

(56) References Cited

U.S. PATENT DOCUMENTS

| | | | |
|---|---|---|---|
| 2022/0111959 | A1 | 4/2022 | Chando et al. |
| 2022/0371721 | A1 | 11/2022 | Boudebiza et al. |
| 2023/0294818 | A1 | 9/2023 | Collado |

* cited by examiner

HUB-MOUNTED ELECTRIC BLADE PITCH CONTROL

CROSS-REFERENCE TO RELATED APPLICATIONS

This application claims the benefit of U.S. Provisional Patent Application No. 63/490,515, filed Mar. 15, 2023, the entire contents thereof are herein incorporated by reference.

BACKGROUND

1. Field

The disclosure relates generally to the field of propellers. More specifically, the disclosure relates to systems and methods for controlling propeller blade pitch.

2. Related Art

Various solutions have been proposed for controlling the pitch of the blades of the propellers on turbomachines of the turboprop or "open rotor" turbo engine type. For example, U.S. Pat. No. 8,167,553 to Perkinson et al. discloses a system for controlling the pitch of propeller blades. U.S. Pat. No. 5,199,850 to Carvalho et al. discloses a distributed propeller control system having a differential speed drive. U.S. Patent Application Publication No. 2017/0247107 to Hauer et al. discloses a rotor for a helicopter that includes a controller that controls the pitch of the rotor blades. U.S. Pat. No. 4,523,891 to Schwartz et al. discloses a propeller pitch adjustment system that uses a piston and torque tube to change the blade pitch.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

According to an embodiment, an electromechanical blade pitch control system includes a propeller hub, a blade having an adjustable pitch angle, and a blade bearing hub operably coupled to the blade. The system includes a linear actuator operably coupled to the blade bearing hub and a rotary actuator operably coupled to the linear actuator via a planetary gear system. The system is configured such that the blade bearing hub, linear actuator, and rotary actuator are housed within the propeller hub, and further configured such that actuation of the linear actuator results in a change in a pitch angle of the blade.

According to another embodiment, an electromechanical blade pitch control system includes a propeller hub, a blade having adjustable pitch angle, and a blade bearing hub operatively coupled to the blade. The system includes a ball screw having a ball nut, with the ball nut being configured to translate linearly in response to rotational movement of the ball screw. The ball nut is operably coupled to the blade bearing hub. The system includes an electric motor arranged fore of the blade and a planetary gear system which transfers rotational motion from the electric motor to the ball screw. The blade bearing hub, the ball screw, the ball nut, and the electric motor are housed within the propeller hub, such that rotating the ball screw results in a change in a pitch angle of the blade.

BRIEF DESCRIPTION OF THE DRAWING FIGURES

Embodiments of the invention are described in detail below with reference to the attached drawing figures. The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Conventional mechanisms for controlling aircraft propeller pitch typically incorporate a central control rod arrangement powered by a spring-loaded hydraulic piston assembly. For example, a central control rod may extend into a propeller hub and couple to propeller blades via linkages such that longitudinal movement of the control rod translates to collective blade pitch adjustment. A spring-loaded mechanism biases the linkages in the return direction to provide control authority in both directions along a longitudinal axis of the control rod. Hydraulic systems generally require frequent maintenance and upkeep to stay within normal operating parameters. The operation of conventional hydraulic systems may suffer in extreme low temperatures, like those encountered while flying at high altitudes or in cold regions. The present system may remedy these drawbacks at least in part, and relates to an electromechanical system to control the incidence angle (otherwise referred to herein as "angle of attack", "incidence angle", or "blade pitch") of one or more propellers. In U.S. application Ser. No. 18/069,397, entitled Electromechanical Blade Pitch Control and filed Dec. 22, 2022, which is incorporated herein by reference in its entirety, an electric motor is used to provide linear actuation of the central control rod. In embodiments described herein, the center control rod is replaced with a ball screw mechanism and the electric motor is physically integrated into the propeller hub.

Figure 1:
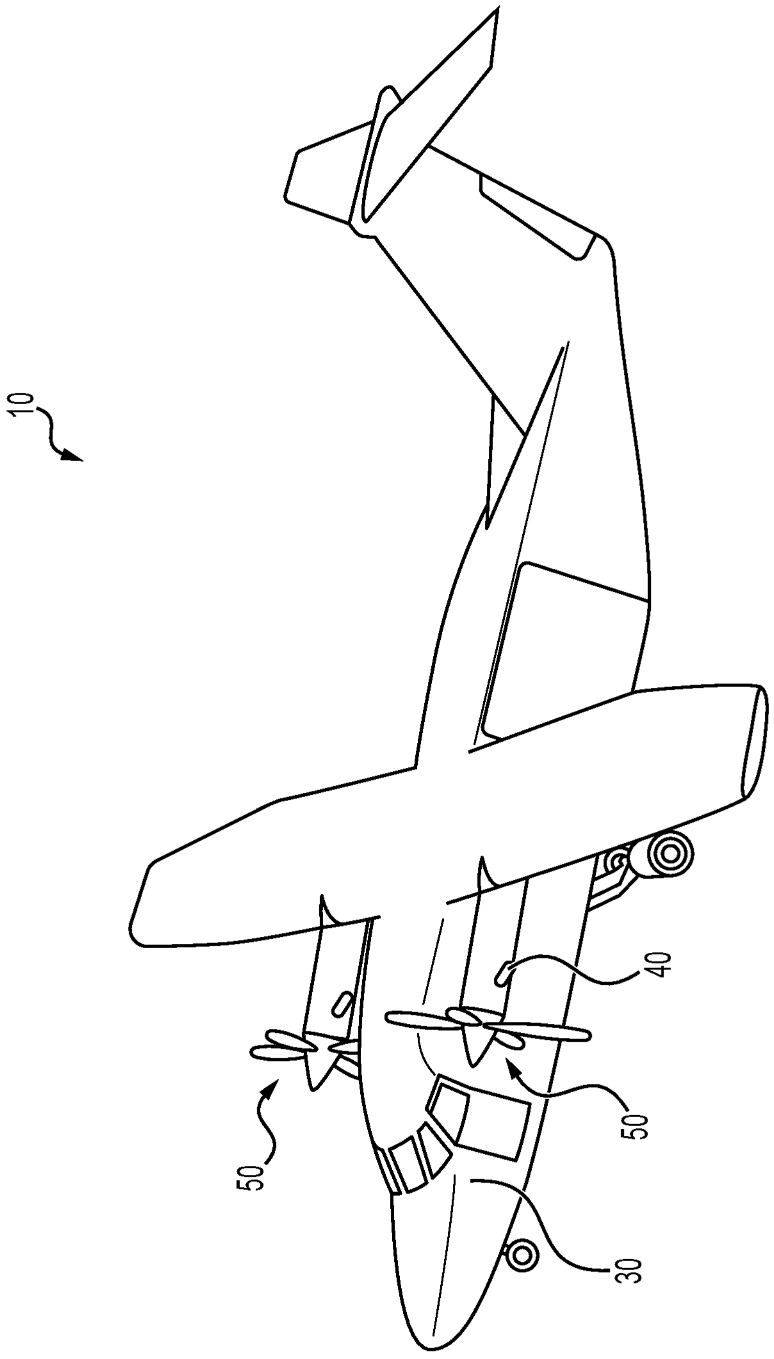
FIG. 1 is a diagram showing an embodiment of an aircraft having an electromechanical blade pitch control system.

FIG. 1 shows an aircraft 10 containing a cockpit 30 and an electric propulsion system 40. Motion may be provided to the aircraft 10 by one or more electric propulsion systems 40. The electric propulsion system 40 may comprise, for example, a propeller mechanically coupled to an electric motor, where the electric motor is configured to rotate the propeller for providing thrust to the aircraft. In some embodiments, the aircraft 10 may comprise a plurality of electric propulsion systems 40. For example, aircraft 10 may include one, two, three four, or more electric propulsion systems 40. In some embodiments, the electric propulsion system 40 may comprise one or more electric rotors. In still more embodiments, aircraft 10 may be a manned or unmanned aerial vehicle. While the electric propulsion system 40 is depicted here as a component of an aircraft (e.g., aircraft 10), it is contemplated that electric propulsion system 40 and corresponding blades 102 may be a component of other vehicles, such as a boat or helicopter.

The electric propulsion system 40 may include a propeller hub 50 having one or more blades 102, whose movement is responsible for propelling the aircraft forwards. As such, many aspects of the blades 102 affect the performance of the electric propulsion system 40 and flight characteristics of aircraft 10. One such example aspect is the rotational angle at which each individual blade 102 extends from the propeller hub 50 (e.g., blade pitch 102A referenced in FIG. 3). Control of the blade 102 pitches (e.g., by way of electromechanical blade pitch control system 100) may allow for greater efficiency and control of the aircraft 10.

Figure 2:
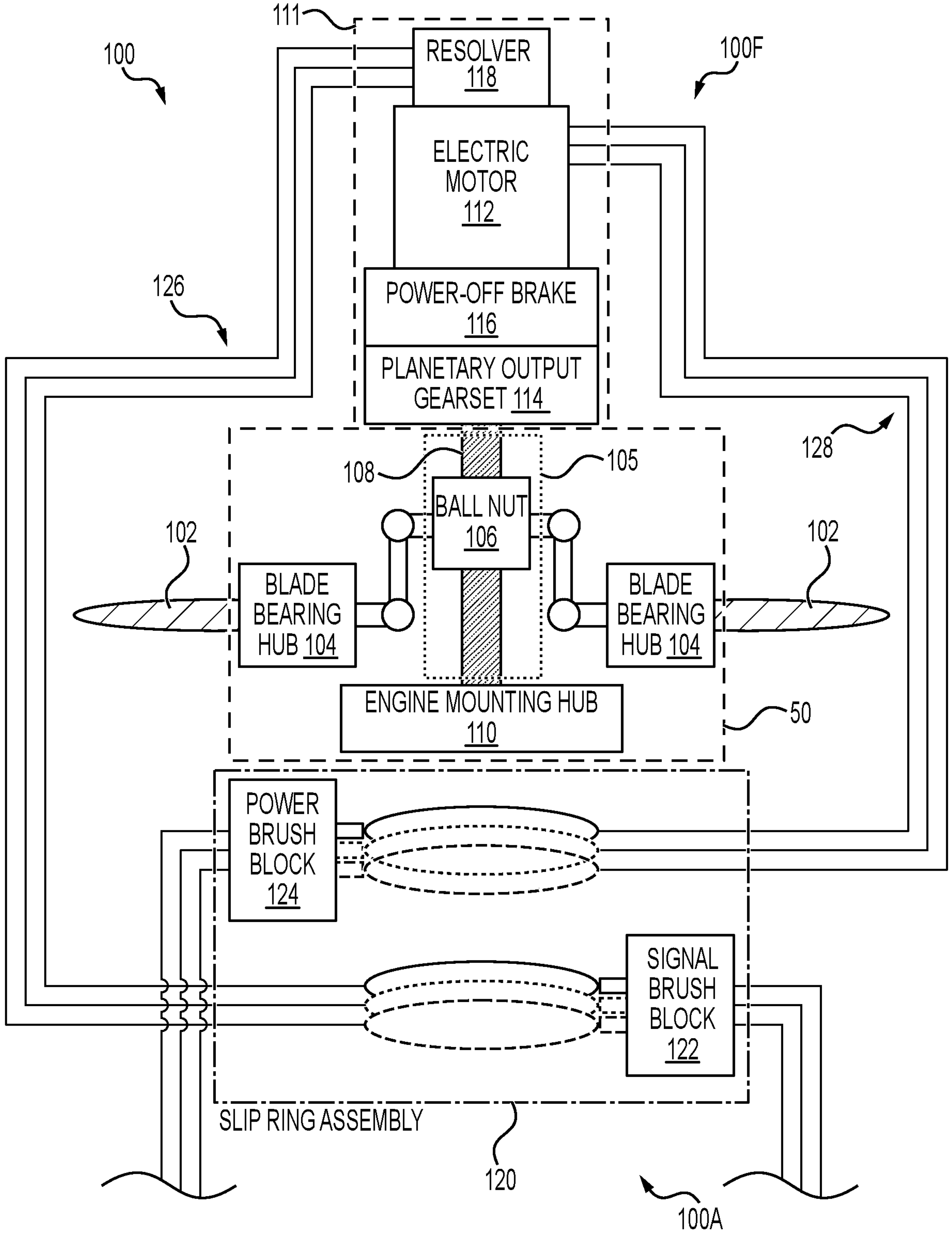
FIG. 2 illustrates a schematic view of the electromechanical blade pitch control system, in an embodiment.

FIG. 2 illustrates a schematic view of electromechanical blade pitch control system 100 for simultaneously controlling the collective blade pitch 102A of all propeller blades 102, in an embodiment. The electromechanical blade pitch control system 100 may reside entirely within the propeller hub 50 such that the blade pitch control system 100 rotates with the propeller hub 50 when the blades 102 spin. The blade pitch control system 100 may comprise one or more blades 102, one or more blade bearing hubs 104 (e.g., a blade bearing hub 104 for each blade 102), a linear actuator 105, such as a ball nut 106 coupled to a ball screw 108, an engine mounting hub 110, and a rotary actuator 111 comprised of a motor 112, a planetary gear reduction set 114, a power-off brake 116, and a resolver 118. The linear actuator 105 may be any linear actuator now known or later developed, and the linear actuator 105 shown in FIGS. 2 and 5 and described in detail below is for exemplary purposes and is not intended to be limiting. In embodiments, it may be preferable that the linear actuator 105 is configured to convert rotational movement from the rotary actuator 111 into linear movement, e.g., as ball nut 106 and ball screw 108 are configured to. The motor 112 may be an electric motor, such as an illustrated embodiment, or may A slip ring assembly 120 may electrically couple the components of the rotary actuator 111 to a power source (not depicted) of the aircraft 10. The blades 102 may be configured to propel a vehicle (e.g., the aircraft 10) in a specific direction. A motor is operatively coupled to the electromechanical blade pitch control system 100 via the engine mounting hub 110 (not shown in FIG. 2) as described below in connection with FIG. 5. In some embodiments, where the aircraft 10 comprises two or more propeller hubs 50, the aircraft 10 may comprise a plurality of electromechanical blade pitch control systems 100 which are configured to independently adjust the pitch of blades 102 of each propeller hub 50. In embodiments, the blade pitch control system 100 may be devoid of hydraulic components.

The rotary actuator 111 may comprise the electric motor 112, the planetary gear system 114, the power-off brake 116, and the resolver 118. In operation, the electric motor 112 may draw power through the slip ring assembly 120, and may drive the planetary gear set 114 and the ball screw 108 to cause the ball nut 106 to translate along the ball screw 108. This translation in turn may drive the blade bearing hubs 104 to change the blade pitch 102A of the propeller blades 102. The blade pitch control system 100 may be incorporated within (e.g., partially within) the propeller hub 50 such that the system 100 is free to rotate along with the hub 50 (e.g., the blades 102 thereof) during operation. This may occur while other components (such as an engine or electric propulsion system 40 of the aircraft 10) remain substantially fixed along a rotational axis.

Each of the blades 102 of the hub 50 may have associated therewith a blade bearing hub 104 which is configured to pivot or rotate the blade 102 when actuated to change the blade pitch 102A. The blade bearing hubs 104 may be actuated through an operable coupling to the ball nut 106. The ball nut 106 may be configured to linearly translate along the ball screw 108 both in a forward direction (i.e., towards a fore 100F of the propeller hub 50) and in a backwards direction (i.e., towards an aft 100A of the propeller hub 50). This linear motion of the ball nut 106 may be achieved through rotational motion of the ball screw 108 which the ball nut 106 is operably coupled to. For example, the ball screw 108 may rotate in place (i.e., with no linear motion) to drive the ball screw 108 back and forth therealong to change the pitch angle of the blades 102. In embodiments, there may be only a singular ball screw 108 and a singular ball nut 106 which interacts with a plurality of ball bearing hubs 104 (e.g., each of the hubs 104 controlling the pitch of a plurality of blades 102).

The ball screw 108 may be rotationally driven by the planetary gear system 114 operably coupled thereto. The planetary gear system 114 may be configured to transfer motion provided by the electric motor 112 to the ball screw 108. The electric motor 112 may be any suitable motor now known or subsequently developed that is configured to impel the planetary gear set 114. The electric motor 112 may be powered via the slip ring assembly 120. The electric motor 112 may be mounted within the propeller hub 50 such that motion of the motor 112 itself is tied to the motion of one or more of the other components of the propeller hub 50, such as the blades 102. This may be accomplished by locating the electric motor 112 fore 100F of the blades 102 (i.e., within the propeller hub 50).

The electric motor 112 may have a resolver 118 associated therewith which may commutate a current to and provide positional feedback on the electric motor 112. The resolver 118 may have any suitable resolver now known or subsequently developed, though, in embodiments, the resolver 118 may instead be an inductive encoder. The resolver 118 and the electric motor 112 may form part of an electric circuit and receive communication and power through a signal line 126 and a power line 128, respectively, of the slip ring assembly 120. The slip ring assembly 120 may transmit power to the pitch control system 100 through the use of a signal brush block 122 (associated with the signal line 126) and a power brush block 124 (associated with the power line 128). In operation, the slip ring assembly 120 may serve to transmit electrical power between a stationary power source (e.g., a power source of the aircraft 10) and one or more rotating components (e.g., the electric motor 112) via the power line 128 and the power brush block 124. Likewise, the slip ring assembly 120 may serve to transfer signals (i.e., transmit and/or receive electrical signals) between a controller (e.g., propulsion controller 204 of FIG. 4) and one or more rotating components (e.g., resolver 118) via the signal line 126 and the signal brush block 122.

The power-off brake 116 may be configured to arrest the motion of the pitch control system 100 to prevent changes in the blade pitch 102A of the blades 102. The power-off brake 116 may be arranged upstream of the ball nut 106 and the ball screw 108 (e.g., upstream of the planetary gear system 114) such that actuating the power-off brake 116 may arrest the motion of all system 100 components downstream of the power-off brake 116. In the embodiment depicted in FIG. 2, the power-off brake 116 may be configured to arrest the motion of the planetary gear system 114, the ball screw 108, the ball nut 106, and the blade bearing hubs 104. The power-off brake 116 may be further configured to operate without a continuous power draw, meaning that the power-off brake 116 may be put in an on/off state which either allows or halts, respectively, changes in the blade pitch 102A without having to receive a constant electrical signal or command to do so. In situations where electricity is no longer being provided to the pitch control system 100, such as in an emergency where the aircraft 10 power source malfunctions or otherwise fails, the power-off brake 116 may default to preventing blade pitch 102A changes. For example, the pitch control system 100 may place the blades 102 at a "feathering" blade pitch 102A if the system 100 loses power.

The engine mounting hub 110 may provide a fixed point of contact for the rest of the components of the pitch control system 100 to rotate about. The engine mounting hub 110 may further be operably coupled to an engine (e.g., the electric propulsion system 40) of the aircraft 10. The engine mounting hub 110 may transmit motion to the system 100 (e.g., the blades 102 thereof) from an engine of the aircraft 10 such that the system 100 may rotate with respect to the aircraft 10 (i.e., the components of the system 100 may rotate with the propeller hub 50 during operation). While doing so, the aircraft 10 components providing this motion (e.g., an aircraft 10 engine) may remain rotationally fixed. Electromechanical blade pitch control system 100 provides control authority in both directions, increasing blade collective and decreasing blade collective. In other words, system 100 is double-acting, providing control authority in both directions rather than providing control authority in one direction and requiring a return spring mechanism for the opposite direction.

Figure 3:
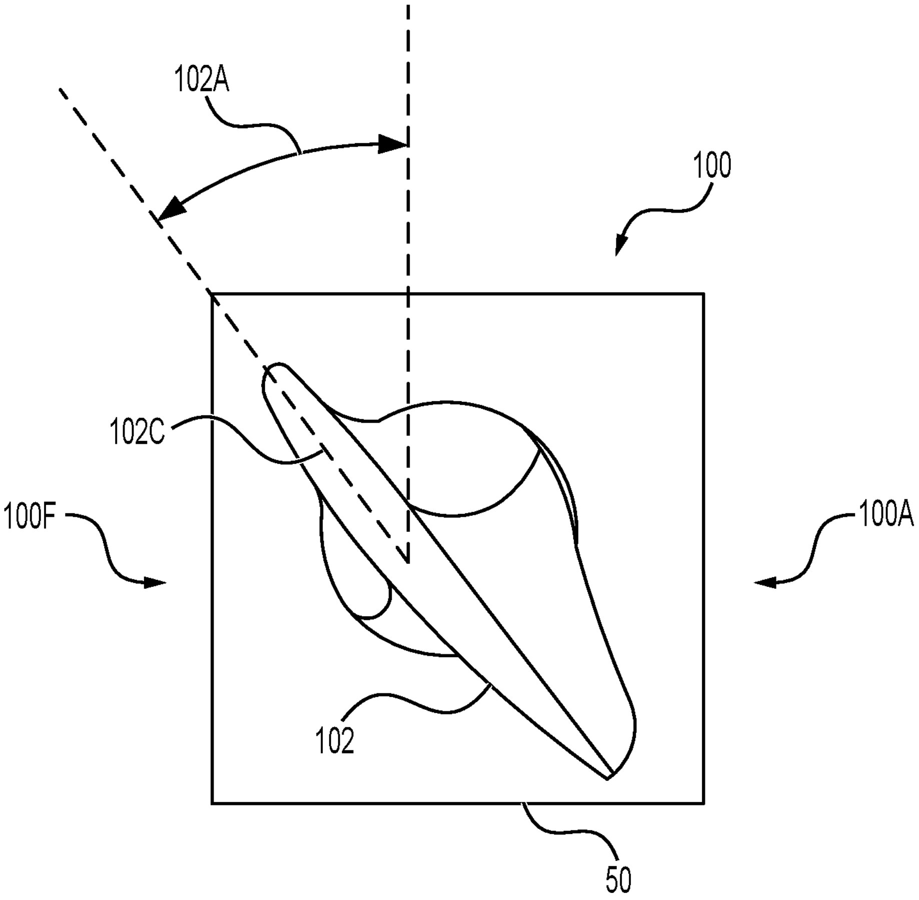
FIG. 3 illustrates a schematic view of a blade and a blade pitch angle of the electromechanical blade pitch control system of FIG. 2.

FIG. 3 shows a schematic view of a blade 102 and a blade pitch 102A of the electromechanical blade pitch control system 100. This blade pitch 102A may be adjusted via movement of the components illustrated in FIG. 2 (e.g., the combined rotational movement of the ball screw 108 and linear movement of the ball nut 106). It is noted that the blade 102 in FIG. 3 is extending from the propeller hub 50 towards the viewer. As shown in FIG. 3, the incidence pitch 102A is an incidence angle established between a blade chord line 102C and a substantially vertical plane. As briefly mentioned above, altering the blade pitch 102A of the one or more blades 102 of the propeller hub 50 may substantially impact motions of the aircraft 10. For example, blade pitch 102A establishes the force of the blade 102 against the air. Generally, the greater the blade pitch 102A, the greater the thrust blade 102 provides. Conversely, the lower the blade pitch 102A, the lower the thrust blade 102 provides. In embodiments having a plurality of blades 102, actuating the ball screw 108 and ball nut 106 of the system 100 may adjust (e.g., adjust equally) the blade pitch 102A of all blades 102 associated with that system 100.

Control of the electromechanical blade pitch control system 100 may be accomplished by a variety of methods commonly known. For example, the blade pitch control system 100 may be controlled by a controller, a mechanical connection, an electrical connection, et cetera. In some embodiments, a connection between a controller may be one of a wired or a wireless connection. In cases where blade pitch control system 100 is controlled by a controller, this control may be manual or automatic. In some examples, a user (i.e., a pilot or co-pilot) may input into the controller a specific desired blade pitch 102A of the blades 102. In other examples, the controller may sense, via inputs from one or more portions of the aircraft, that the pitch of the blades 102 needs to be changed to perform a certain task of the aircraft (e.g., if the aircraft is taking off, the controller, via actuation of blade pitch control system 100, may change the blade pitch 102A of the blades 102 to propel the aircraft forwards).

Figure 4:
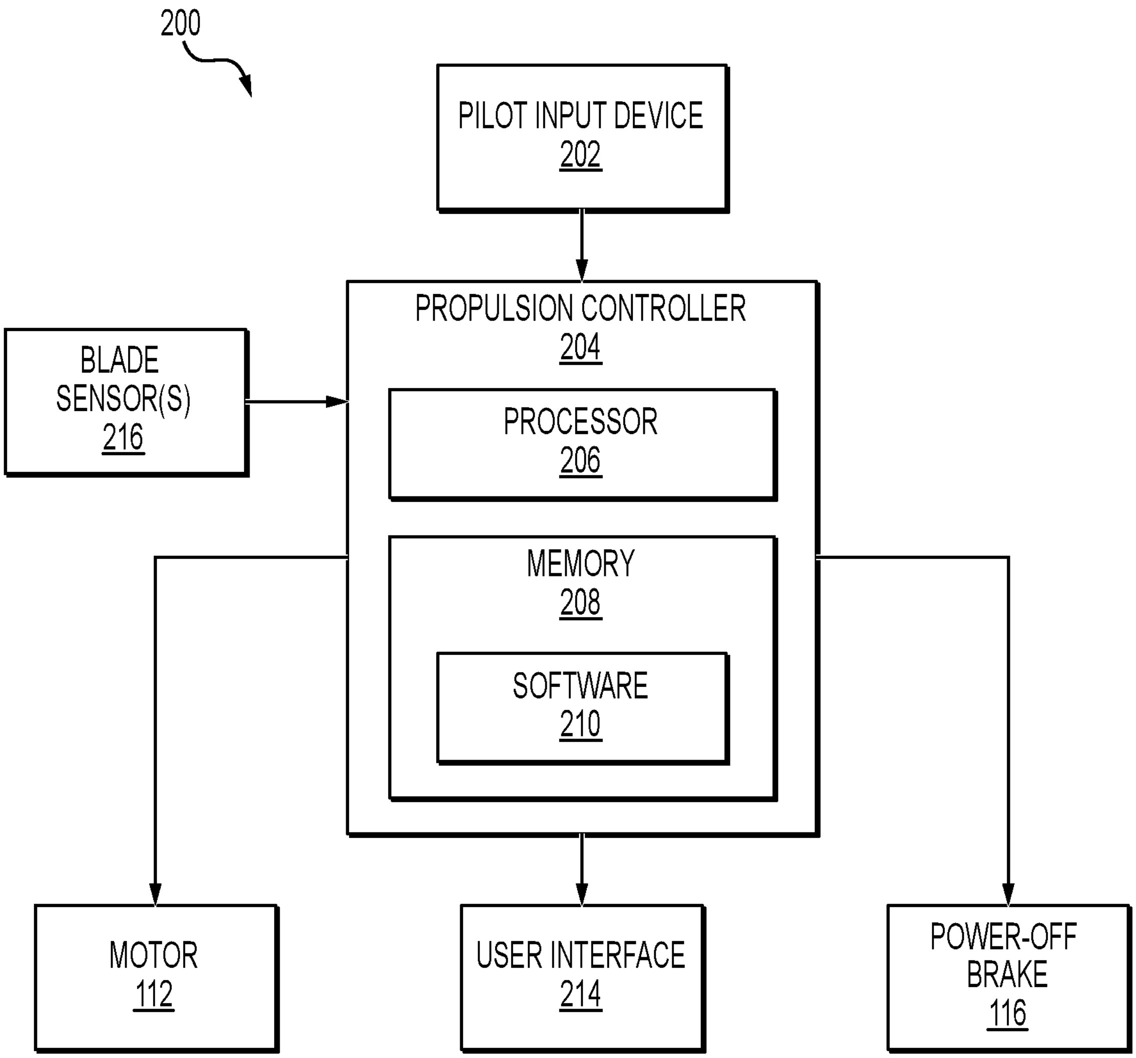
FIG. 4 is a block diagram illustrating a control architecture for controlling various components of the electromechanical blade pitch control system of FIG. 2, in an embodiment.

FIG. 4 is a block diagram illustrating an exemplary control architecture 200 for controlling various components of the electromechanical blade pitch control system 100. Control architecture 200 includes a pilot input device 202, which is operatively linked to a propulsion controller 204. A user may direct different actions of the aircraft 10 using pilot input device 202. Pilot input device 202 may comprise one of a lever, a button, a pedal, a throttle, a joystick, a yoke, a control wheel, a center stick, a sidestick, a touchscreen, et cetera. Based on actions associated with the pilot input device 202, the propulsion controller 204 may determine adjustments necessary to the blade pitch 102A of blades 102.

Propulsion controller 204 may be a microcontroller, a microprocessor, or programmable logic controller (PLC). In some embodiments, propulsion controller 204 may be a computer (e.g., an aircraft flight computer or separate computer), having a memory 208, including a non-transitory computer-readable medium for storing software 210, and a processor 206 for executing instructions of software 210 as known to one of skill in the art. In certain embodiments, some, or all of software 210 is configured as firmware for providing low-level control of devices of the electromechanical blade pitch control system 100. Communication between propulsion controller 204 and devices of electromechanical blade pitch control system 100 may be by one of a wired and/or wireless communication media. For instance, the propulsion controller 204 may be communicatively coupled to the power-off brake 116 with a wired and/or wireless connection to modify the operation thereof. In some embodiments, the motor 112 may be controlled by, for example, a motor controller (e.g., alternately or in addition to the propulsion controller 204 and/or the resolver 118).

Figure 5:
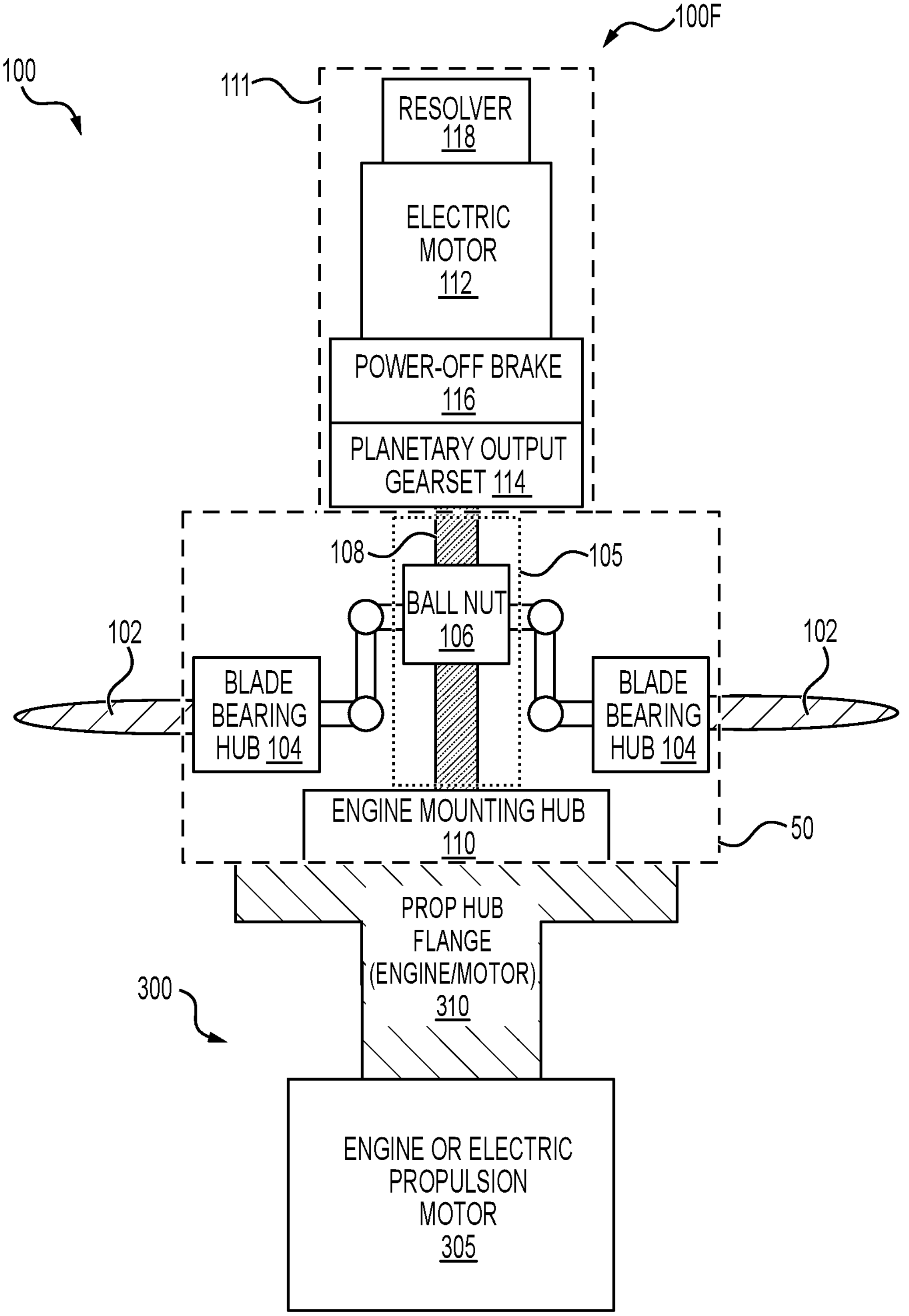
FIG. 5 illustrates a schematic view of the electromechanical blade pitch control system, according to another embodiment.

In some embodiments, one or more blade sensors 216 may be used for determining the incidence pitch 102A of blades 102 and providing data about the incidence pitch 102A to the propulsion controller 204, alternately or additionally to the feedback provided by the resolver 118. The blade sensors 216 may be arranged at, around, near, or in the vicinity of one or more blades 102. A user interface 214 may optionally be communicatively coupled with propulsion controller 204 for displaying information about the incidence pitch 102A of blades 102 or other information from propulsion controller 204. For example, information regarding propeller pitch may be used for regulatory requirements or for maintenance purposes. Additionally, user interface 214 may be used to display information to the pilot when the blade pitch angle has entered a potentially hazardous range during flight. FIG. 5 depicts a schematic view of the electromechanical blade pitch control system 100 which shows the system 100 being operably coupled to an electric propulsion unit 300 of the aircraft 10. The electric propulsion unit 300 may comprise an engine or electric motor 305 may provide rotational motion to the propeller hub 50 via the propeller hub flange 310 which is operably coupled to the mounting hub flange 110. While not depicted in FIG. 5, the system 100 may still be communicatively coupled (e.g., able to transmit/receive signals and power) to the aircraft 10 via the slip ring assembly 120 of FIG. 2.

Although the invention has been described with reference to the embodiments shown in the attached drawing figures, it is noted that the equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An electromechanical blade pitch control system, comprising: a propeller hub; a blade having an adjustable pitch angle; a blade bearing hub operably coupled to the blade; a linear actuator operably coupled to the blade bearing hub; and a rotary actuator operably coupled to the linear actuator via a planetary gear system; wherein the blade bearing hub, linear actuator, and rotary actuator are housed within the propeller hub; and wherein actuation of the linear actuator results in a change in a pitch angle of the blade; wherein the rotary actuator includes an electric motor; wherein the rotary actuator further includes a resolver configured to provide positional feedback on the electric motor; and a slip ring assembly connected to and in data communication with the rotary actuator, the slip ring assembly comprising: a signal brush block connected to and in data communication with the resolver; and a power brush block connected to and in data communication with the electric motor.

2. The system of claim 1, wherein the linear actuator is a ball screw having a ball nut configured to translate linearly along an axis of rotation of the ball screw in response to rotation of the ball screw, the ball nut being operably coupled to the blade bearing hub.

3. The system of claim 1, wherein the rotary actuator includes a power-off brake upstream of the linear actuator.

4. The system of claim 1, wherein the rotary actuator is arranged fore of the blade.

5. The system of claim 1, further comprising an electronic controller connected to and in data communication with the slip ring assembly, the controller being configured to receive an input from a pilot input device and effectuate the rotary actuator in response to the input from the pilot input device.

6. The system of claim 1, wherein a loss of power to the blade pitch control system biases the blade towards a feathering blade pitch angle.

7. An electromechanical blade pitch control system, comprising: a propeller hub; a blade having adjustable pitch angle; a blade bearing hub operatively coupled to the blade; a ball screw having a ball nut, the ball nut being configured to translate linearly in response to rotational movement of the ball screw, the ball nut being operably coupled to the blade bearing hub; an electric motor; and a planetary gear system which transfers rotational motion from the electric motor to the ball screw, wherein: the blade bearing hub, the ball screw, the ball nut, and the electric motor are housed within the propeller hub; the electric motor is arranged fore of the blade; and, rotating the ball screw results in a change in a pitch angle of the blade; a resolver configured to provide positional feedback on the electric motor; and a slip ring assembly comprising: a signal brush block connected to and in data communication with the resolver via at least one signal line; and a power brush block connected to and in data communication with the electric motor via at least one power line.

8. The system of claim 7, further comprising a power-off brake upstream of the ball screw, the ball nut, and the blade bearing hub.

9. The system of claim 7, further comprising an electronic controller comprising a processor and non-transitory computer memory and being configured to effectuate the electric motor in response to an input.

10. The system of claim 9, wherein the input is generated by a pilot input device connected to and in data communication with the controller, the pilot input device being selected from the group consisting of: a lever, a button, a pedal, a throttle, a joystick, a yoke, a control wheel, a center stick, a sidestick, and a touchscreen.

11. The system of claim 9, further comprising at least one sensor in data communication with the controller, the sensor being configured to determine an incidence pitch of the blade.

* * * * *